United States Patent [19]
Vogel et al.

[11] Patent Number: 4,651,594
[45] Date of Patent: Mar. 24, 1987

[54] APPARATUS FOR CONTROLLING TILTING OR SLIDING MOVEMENTS OF SLIDABLE-TILTABLE ROOFS

[75] Inventors: Wolfgang Vogel, Krailling; Arpad Fürst, Munich, both of Fed. Rep. of Germany

[73] Assignee: Webasto-Werk W. Baier GmbH & Co., Postfach, Fed. Rep. of Germany

[21] Appl. No.: 679,443

[22] Filed: Dec. 7, 1984

[30] Foreign Application Priority Data

Dec. 17, 1983 [DE] Fed. Rep. of Germany ....... 3345798

[51] Int. Cl.⁴ ............................................... F16H 5/52
[52] U.S. Cl. ........................................ 74/810; 74/804;
49/209; 296/223; 192/97
[58] Field of Search ................. 74/804, 805, 810, 740, 74/526, 527; 192/67 R, 94, 97; 49/209, 210; 296/223, 222, 221, 216

[56] References Cited

U.S. PATENT DOCUMENTS

| | | | |
|---|---|---|---|
| 2,846,034 | 8/1958 | Mros | 74/804 X |
| 2,932,992 | 4/1960 | Larsh | 74/804 |
| 3,158,244 | 11/1962 | Lanigan et al. | 192/94 X |
| 3,303,712 | 6/1964 | Normann | 192/94 X |
| 3,948,119 | 4/1976 | Schlapp | 74/805 |
| 4,023,858 | 5/1977 | Bienert et al. | 296/223 X |
| 4,113,304 | 9/1978 | Leiter | 296/223 X |
| 4,466,658 | 8/1984 | Furst et al. | 74/804 X |
| 4,468,063 | 8/1984 | Yukimoto et al. | 296/223 |
| 4,531,777 | 7/1985 | Bienert et al. | 296/223 |

FOREIGN PATENT DOCUMENTS 2634626 2/1978 Fed. Rep. of Germany .
3200655 7/1983 Fed. Rep. of Germany .

Primary Examiner—Leslie Braun
Assistant Examiner—Mart Belisarri
Attorney, Agent, or Firm—Sixbey, Friedman & Leedom

[57] ABSTRACT

Apparatus for the control of the tilting movement and the sliding movement of the cover of slidable-tiltable roofs on vehicles with a rotatable hub on an input side, a driving pinion on an output side, an arrangement for establishing a driving connection between the hub and the driving pinion for producing a sliding movement of the cover and with a reduction stage which is engaged by axial shifting of a control gear for driving the driving pinion by way of the hub for the tilting movement with a reduced transmission ratio relative to that for the sliding movement. Engagement of the reduction stage occurs automatically when starting out from a cover reference position, the hub is moved in a rotational direction corresponding to that for producing the cover tilting movement. The rotational axes of the hub and of the driving pinion coincide and the control gear is disposed coaxially in relation to the common rotational axis of the hub and of the driving pinion. The control gear, also, is a part of a control coupling for transferring of the rotational movement from the hub to the driving pinion.

21 Claims, 15 Drawing Figures

APPARATUS FOR CONTROLLING TILTING OR SLIDING MOVEMENTS OF SLIDABLE-TILTABLE ROOFS

BACKGROUND AND SUMMARY OF THE INVENTION

The invention relates to an apparatus, for the control of the tilting movement and sliding movement of the cover of slidable-tiltable roofs of vehicles, having a hub on an input side, a driving pinion on an output side, an arrangement for establishing a driving connection between the hub and the driving pinion for producing a shifting movement, a reduction stage (which may be actuated by axial shifting of a control gear) for the driving of the driving pinion by way of the hub for the tilting movement with a reduced transmission ratio relative to that for the sliding movement, and with an arrangement for the automatic engagement of the reduction stage in the event that a driving of the hub starts out from a reference position of the cover in a rotational direction corresponding to the tilting movement of the cover.

In the case of a known apparatus of this kind (German Offenlegungsschrift No. 26 34 626), a crank handle is connected with a driving shaft on which the control gear is disposed in a torsionally fixed, but axially shiftable, manner. The control gear has two axial sections with variable number of teeth. One section is provided with a full toothing extending over the entire periphery, while the other section has only two groups of only three teeth, each lying diametrically opposed to one another. Depending upon the axial position of the control gear, one or the other of its sections is in engagement with a gear which is attached on a power take-off shaft running in parallel to the driving shaft. This results in a correspondingly variable transmission ratio between the driving shaft and the power take-off shaft carrying the driving pinion for the cover. The control gear, furthermore, drives a gear developed as a cam plate, in a highly reduced way, by way of an intermediate gear. The intermediate gear and the gear forming the cam plate are seated on two additional shafts parallel to the driving shaft and the power take-off shaft. A pivoting lever is in engagement with the cam plate. With the pivoting lever, the control gear is shifted on the driving shaft counter to the action of a spring in such a way that its two groups of diametrically opposed teeth come into engagement with the gear attached to the power take-off shaft, whenever, starting out from the closed position of the cover, the crank handle is turned in a direction for producing a tilting opening movement of the cover. Whenever, on the contrary, starting out from the closed position of the cover, the crank handle is turned in a direction for producing a sliding opening movement of the cover, then the full toothing of the control gear becomes effective.

The known apparatus, to be sure, has the advantage that, as a result of the reduction of the tilting movement relative to the sliding movement, a sensitive adjustment of the cover to the desired angle of tilting is achieved. Also, in the case where the crank handle is a snap handle, a snapping of the crank handle into a receiving space becomes possible in a whole series of variable sliding positions of the cover. Likewise, the selection of the respective ratio of the variable transmission for the tilting and sliding movements takes place automatically, that is to say, without any special additional effort by the user. However, in the case of the known arrangement, these advantages must be acquired with a relatively bulky construction of the control arrangement.

Thus, a primary object of the present invention is based on the task of creating a control arrangement of the initially mentioned type which has a particularly compact type of construction.

According to the invention, this object is achieved, in accordance with preferred embodiments, through the fact that the rotational axes of the hub and of the driving pinion are made to coincide, as well as through the fact that the control gear is disposed coaxially to the common axis of the rotation of the hub and the driving pinion, and that it is part of a control coupling for transferring the rotational movement from the hub to the driving pinion.

The control arrangement according to the invention permits, in the same manner as the apparatus known from the German Offenlegungsschrift 26 34 626, the automatic achievement of variable transmission ratios for the tilting and sliding movements of the cover, but in the plane perpendicularly to the driving pinion axis, requires a fraction of the mounting space needed for the insertion of the known control arrangement.

An arrangement for the control of the tilting movement and of the sliding movement of the cover of sliding-tilting roofs is also known, already, wherein the rotational axes of the hub on the input side and of the driving pinion coincide (U.S. Pat. No. 3,948,119). At the same time, however, the driving pinion is fixedly and directly connected with the hub on the input side so that in the case of the sliding movement, just as in the case of the tilting movement, a direct drive takes place, which, for example, makes a sensitive adjustment of the position of inclination of the cover impossible.

In accordance with another aspect of the invention, the control gear arrangement has an inside thread engaging with the outside thread of the hub, and the control gear cooperates with an interlocking means which prevents, in an angular position corresponding to a reference position of the cover, a rotational movement of the control gear and, in all other angular positions, an axial movement of the control gear. As a result of that, it is possible, in a constructionally simple manner, to take care of the necessary course of movement in the case of a shifting of the control gear.

Achievement of a compact construction of the control arrangement is further facilitated whenever the control gear is provided with an outside toothing which may be selectively brought into engagement with an inside toothing of another coupling part of the control coupling or a gear on the input side of a reduction stage, whereby effectively the control gear assumes a middle position, in the axial direction, whenever it is in an angular position corresponding to the cover reference position.

Preferably, the control gear is in its middle position in engagement with another coupling part of the control coupling, as well as with the gear on the input side of the reduction stage. As a result of that, the driving pinion on the output side for the cover is locked in the reference position of said cover.

Effectively, the control gear is resiliently biased in the direction of its middle position in the case of this embodiment.

In a further embodiment of the invention, the control gear is provided with two control gear parts that are adjustable in a limited way relative to each other in an axial direction and are connected in a torque transmittable manner with one another, the one of the gear parts having an internal thread in enagement with an external thread of the hub, while the other part of the control gear has an external toothing which may be selectively brought into engagement with the internal toothing of the coupling part of the control coupling or the gear of the reduction stage on the input side and is connected with the hub by way of a free wheeling connection for rotation. This development keeps the friction occurring in the case of switching processes particularly slight. At the same time, a spring arrangement for driving the other part of the control gear by spring force in the case of an axial shifting of one part of the control gear is, preferably, present. The one part of the control gear may effectively be disposed inside of the other part of the control gear and possibly two springs of equal strength may be provided which, on the one hand, are supported on axially and mutually opposite sides of the one part of the control gear and, on the other hand, at the other part of the control gear.

The reduction stage which may be actuated for the tilting movement of the cover, is formed, advantageously, as a planetary gear. The use of planetary gears is certainly known, per se, in hand operated driving mechanisms for moveable covers in roofs of vehicles (German Offenlegungsschrift No. 32 00 655). There, however, the planetary gear is effective only for the sliding movement of the cover and, therefore, it lacks a variable transmission ratio for two types of cover movement, which is particularly desired, because, for the two paths of movement, adjusting distances of considerably variable lengths are needed.

The other half of the coupling of the control coupling, at the same time, may form the planetary carrier of the planetary gear in the interest of minimizing the number of individual parts, while the control gear for the sliding movement of the cover, may, effectively, be brought into engagement with an internal toothing of the sun wheel of the planetary gear.

In further development according to the invention, a limiting arrangement for limiting the rotary movement of the hub, in terminal positions of the cover in both sliding and tilting movements, exists as compared to the reference position of the cover. Furthermore, an additional locking arrangement for the releasable locking of the hub may be present in the position corresponding to the reference position of the cover. Such a locking arrangement is desirable, above all, in the case of control arrangements with a crank handle, in order that the user may recognize the reaching of the closed position of the cover without having to look at the cover and, as a result of that, being distracted from observation of the road.

Part of the limiting arrangement and/or the locking arrangement is advantageously a rotatable construction part (control ring) disposed substantially concentrically to the common axis of hub and driving pinion, which construction part is driven by way of an additional reduction stage in such a way that, in case of a rotation of the hub between the positions corresponding to the terminal positions of the cover, it carries out a rotation of less than 360 degrees.

At the same time, the further reduction stage, effectively, has a stationary gear with a toothing concentric to the common axis of hub and driving pinion, which toothing is connected in a meshing engagement with the toothing of the toothed ring which is rotatable on an eccentric connected for rotation with the hub around an axis which, as compared to the common axis of hub and driving pinion, is displaced radially by an amount which is approximately equal to the difference of the circle radii of the base of the toothings of the gear and gear ring. This ensures a particularly space-saving construction even for a control arrangement supplemented in such a way.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
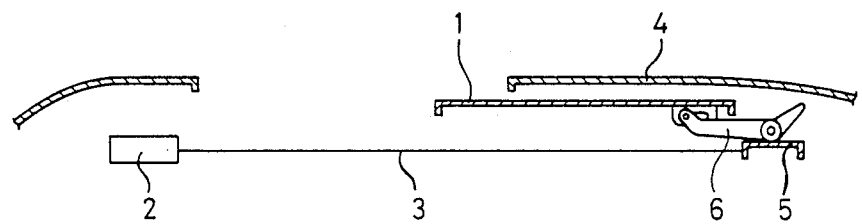
FIG. 1 shows a schematic longitudinal section through the roof of a vehicle with the cover pushed back.

In the case of all embodiments, as illustrated by way of example in FIGS. 1 to 3, the cover 1 of a sliding-tilting roof may be selectively shifted, by means of a control arrangement 2 and pressure resistant cables 3, from the closed position shown in FIG. 2, backwards below a fixed part of the roof 4 (FIG. 1) or it may be tilted upwardly into the position shown in FIG. 3. The cables 3, in the illustrated example, are connected with a transportation bridge 5 which carries a lever mechanism 6 which, on the one hand, is connected with the cover 1 and, on the other hand, at 7, it is guided in a link guide (not shown).

A first embodiment of the control arrangement 2 is illustrated in detail in FIGS. 4 to 8. In this case, a crank handle 10 in the form of a snap crank is provided, the crank part 11 of which is connected rigidly by way of a screw 12 and a notched toothing (splines) 13 with a rotatable hub 14 on an input side. An eccentric 15 is molded onto hub 14, and a toothed ring 17, provided with an inside toothing 16, is rotatably mounted on the peripheral surface of the eccentric 15. The internal toothing 16 engages with an externally toothed ring 18 that is part of a fixed housing lid 19. The rotational axis 20 of the hub 14 is displaced radially relative to the center axis of the eccentric 15 which is about equal to the difference of the circle radii at the base of the teeth of the toothings of the toothed parts 17, 18.

Figure 6:
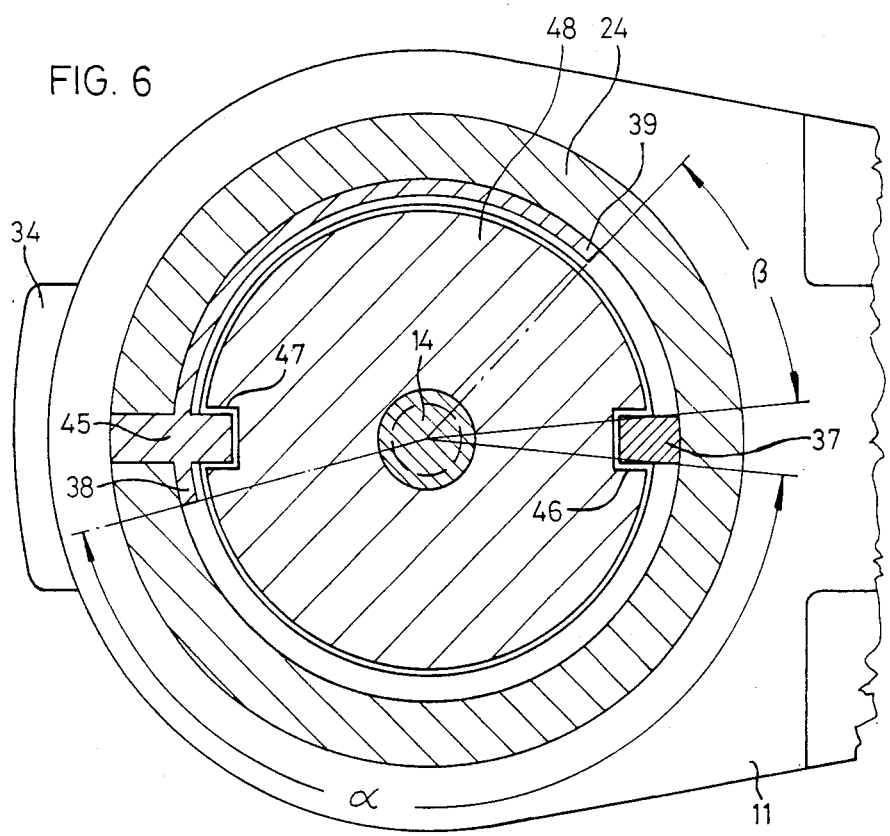
FIG. 6 is a view taken along the line VI—VI of FIG. 5.
Figure 7:
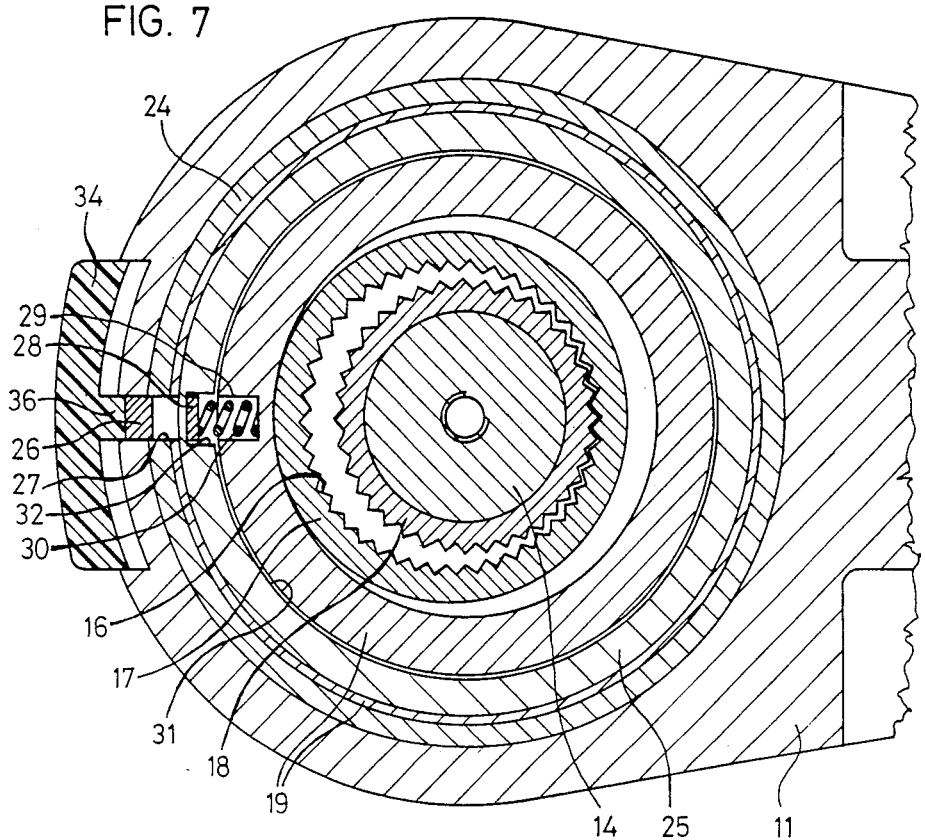
FIG. 7 is a view taken along the line VII—VII of FIG. 5.
Figure 8:
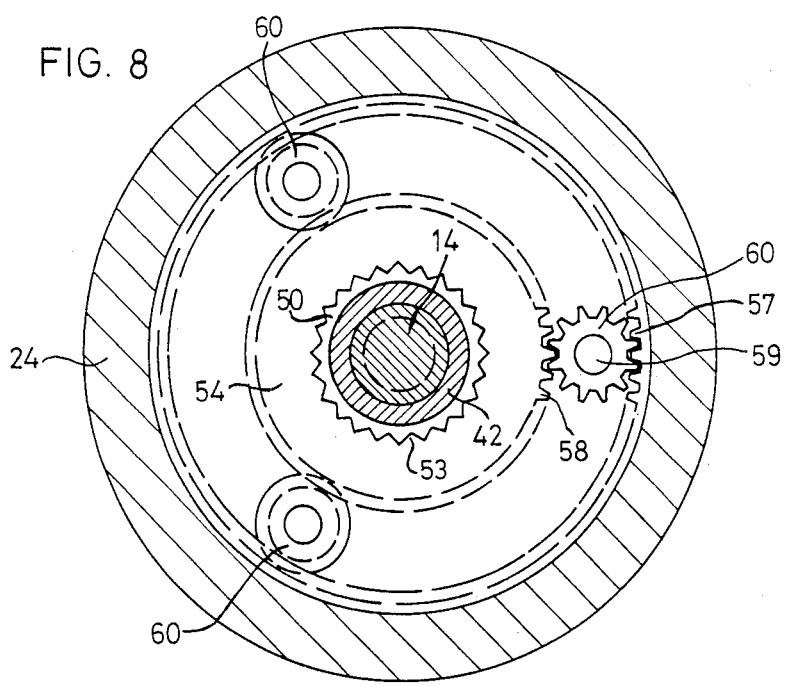
FIG. 8 shows a view taken along the line VIII—VIII of FIG. 5.

Upon rotating the hub 14, the center axis of the toothed ring 17 is caused, by the eccentric 15, to make a circulatory movement around the rotational axis 20 of the hub 14. Simultaneously, a rotational movement of the toothed ring 17 occurs that is reduced as compared to the frequency of rotation of the hub 14. The reduction ratio depends, in a known manner, on the difference in the number of teeth of the toothings of the parts 17, 18. The ratio of the invention has been selected such that sliding movement of the cover 1 from the closed position into the fully pushed back position, which requires a certain number of full rotations of the hub 14, will occur while the toothed ring 17 carries out a rotational angle $\alpha$. On the other hand, a rotation of the hub 14, producing a tilting of the cover 1 from the closed position into the fully extended position, occurs within a rotational angle $\beta$ of the toothed ring 17 (FIG. 6).

The toothed ring 17 is connected with a control ring 23 in a torque transmittable manner by way of a driver 22. The driver 22 projects radially inward from the control ring 23 and it engages in a radial groove formed in the periphery of the toothed ring 17 that has a length which is sufficient to permit the eccentric movement of the toothed ring 17 with reference to the control ring 23, i.e., the groove is radially longer than driver 22. The control ring 23 is mounted to be rotatable about the axis 20 within a housing 24 that serves as a carrier, and has an edge 25 which projects axially downward. A stop pin 26 is mounted to slide radially within a radial bore 27 of the housing lid 19 and of the housing 24 connected with it. The stop pin 26 is provided with a projection 28 which reaches from inside into the control ring 23. A return spring 30 is inserted into a radial bore 29 of the housing lid 19 and acts to bias the stop pin 26 radially outward.

Figure 2:
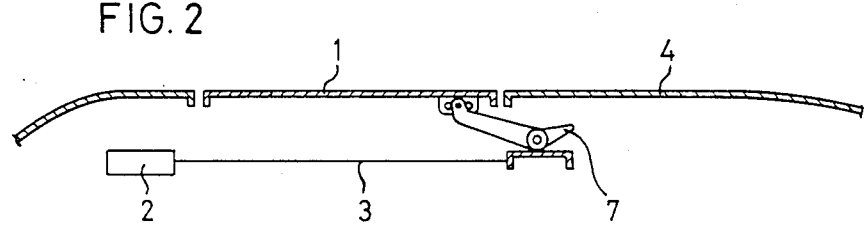
FIG. 2 shows a view corresponding to FIG. 1 but with the cover in closed position.
Figure 3:
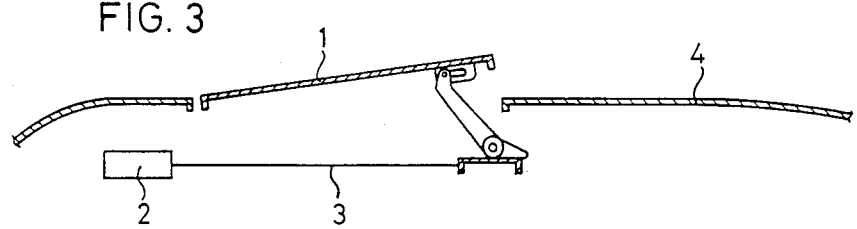
FIG. 3 shows a view corresponding to FIGS. 1 and 2 but with the cover in an upwardly tilted position.
Figure 4:
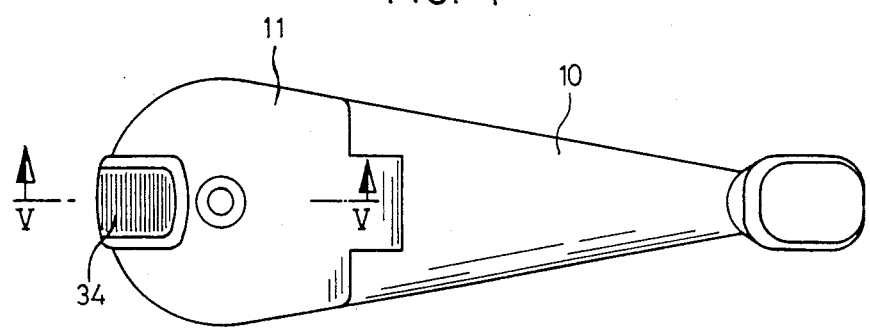
FIG. 4 is a bottom plan view of a control arrangement provided with a crank handle.

In all positions of the cover 1, except the closed position of FIG. 2, the stop pin 26 is prevented from sliding outwardly under the action of spring 30 through the fact that the projection 28 engages against the inner wall 31 of the edge 25 of the control ring 23. If, however, the crank handle 10 reaches a position which corresponds to the closed position of the cover 1 (FIGS. 2 and 7), then the stop pin 26 is freed as a result of a recess 32 that is formed in the inside wall 31 of the control ring edge 25 for a radially outward directed movement, so that the spring 30 pushes the stop pin 26 outward into an opening 33 of the crank part 11. As a result, any additional relative movement between the crank part 11 and the housing 24 will be prevented, and the hub 14 is releasably locked in a position corresponding to the closed position of the cover.

For freeing the stop pin 26 from opening 33 and recess 32, a slide 34 is provided that is guided on the crank part 11 so as to be radially shiftable by a limited amount. The slide 34 is biased radially outwardly by means of a spring 35. Whenever the slide 34 is pushed radially inwardly by hand, the stop pin 26 is pushed into the housing 24 by way of a projection 36 of the slide 34 and the crank part 11 is released for a rotational movement. Whenever the crank handle 10 is turned in one or the other rotational direction, the control ring 23 is also turned by way of the reduction stage formed by the gear 18 and the toothed ring 17, so that the inside wall 31 of the edge 25 of the control ring 23, once again, is placed in front of the projection 28 of the stop pin 26. As a result, the stop pin 26 is, again, held fast. It can only jump outward again under the influence of the return spring 30 when the recess 32 of the edge 25 of the control ring 23 again reaches the position which corresponds to the closed position of the cover 1 (such a position of ring 23 occurrs only once throughout the full range of movements of cover 1, since the noted angles $\alpha$ and $\beta$, combined, total less than 360 degrees as shown in FIG. 6).

The control ring 23, furthermore, is provided with an inward reaching stop 37 that projects upwardly and radially inwardly. This stop 37 encounters counterstops 38, 39, which are fixed in the housing, whenever the control ring 23 has moved from a position corresponding to the cover closed position through the full extent of either the rotational angle $\alpha$ or the rotational angle $\beta$ and the cover 1 has, accordingly, been fully pushed back (FIG. 1) or fully tilted out (FIG. 3).

The hub 14 has an external thread 40 which is in engagement with a corresponding internal thread 41 of a control gear 42 placed on the hub 14. Screw springs 43, 44 of equal strength act on the faces of the control gear 42, the springs 43, 44 being seated coaxially in relation to the rotational axis 20 and acting to hold the control gear 42 in the middle position illustrated in FIG. 5. In this middle position, the control gear 42 is secured by the stop 37 of the control ring 23 and a stop 45 fixed in the housing, the stop 45 being connected unitarily with the counterstops 38, 39. In the relative position of the housing 24, control ring 23 and control gear 42 corresponding to the closed position of the cover 1 (illustrated in FIGS. 5 and 6), the stop 37 of the control ring 23 is diametrically opposed to the stop 45 fixed in the housing, and the stops 37, 45 engage with recesses 46 or 47 at the edge of a control disc 48 that is unitarily connected with the control gear 42.

The control gear 42 has an external toothing 50 which, selectively, may be brought into engagement with an internal toothing 51 of a planetary carrier 52 or the internal toothing 53 of a sun wheel 54. The sun wheel 54 is rotatably mounted on the planetary carrier 52, which, itself, is rotatably mounted in the housing 24. The planetary carrier 52 has a shaft stump 55 upon which a driving pinion 56 is firmly secured. The housing 24, at the level of the sun wheel 54, has an internal toothing 57 which lies concentrically to an external toothing 58 of the sun wheel 54. At the planetary carrier 52, three stump shafts 59, running parallel to the rotational axis 20, are attached to positions that are displaced in the peripheral direction in relation to one another by 120 degrees, each stump shaft 59 carrying a planetary gear 60 in a freely rotatable manner. The planetary gears 60 engage with the external toothing 58 of the sun wheel 54 as well as with the internal toothing 57 of the housing 24. The driving pinion 56, itself, engages with the pressure resistant cables 3 for the shifting of the cover 1.

The control gear 42, the planetary carrier 52, and the sun wheel 54 constitute parts of a control coupling designated, as a whole, by reference numeral 62, for the transmission of the rotary movement of the hub 14 to the driving pinion 56. The sun wheel 54, the planetary gears 60 and the internal toothing 57 of the housing constitute a reduction stage for the drive of the pinion 56 that causes the number of rotations of the pinion 56 to be reduced as compared to that of the hub 14.

Whenever the crank handle 10 is freed, in the above-explained manner, for rotational movement relative to the housing 24, by operation of the slide 34, and whenever the hub 14 is turned by way of the crank 10, then, as a result of the mutual engagement of the threads 40, 41, the control gear 42, which at first is rotationally locked by means of stops 37, 45, will be shifted axially. Depending upon the direction of rotation of the hub 14, the external toothing 50 of the control gear 42 is either engaged with the internal toothing 51 of the planetary carrier 52 or with the internal toothing 53 of the sun wheel 54. Thus, the driving pinion 56, which is fixed to the planetary carrier 52, is driven by the hub 14 either directly or with a reduced transmission ratio. The construction, for example, with a right-hand rotation of the crank 10, beginning in the case of a zero or reference position (corresponding to the closed position of the cover) illustrated in the FIGS. 5 and 6, the control gear 42 will engage the sun wheel 54 and with a lefthand rotation of crank 10 the control gear 42 will engage the planetary carrier 52, in order to slide or to tilt the cover 1.

In the case of the axial shifting and the subsequent rotational movement of the control gear 42, its control disc 48 comes to lie above or below the stops 37, 45. These stops then prevent an axial movement of the control gear 42 until the zero or reference position shown has been reached again and the stops 37, 45 can again engage with the respective receses 46, 47. That is to say, a changeover from direct drive to reduced drive or vice versa is possible only in the reference position. Whenever the latter is reached, then the stop pin 26 locks the crank 10; simultaneously, the springs 33, 44 force the control gear 42 into the middle position shown in FIG. 5. Thus, planetary carrier 52 is both a coupling part of the control coupling for producing the reduced drive and part of the drive arrangement for direct driving of the drive pinion.

Figure 5:
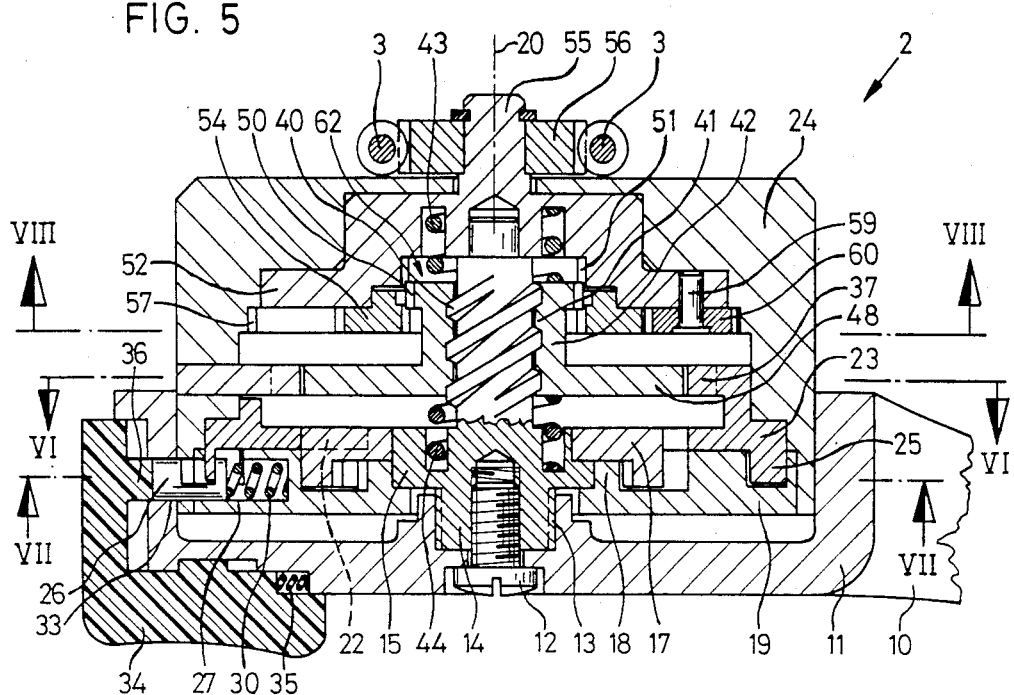
FIG. 5 shows an enlarged sectional view taken along the line V—V of FIG. 4.

As becomes clear from FIG. 5, the external toothing 50 of the control gear 42 is developed such that, in the middle position of the control gear 42, it engages with the planetary carrier 52 as well as the sun wheel 54. As a result of that, the driving pinion 56 is locked in the closed position of the cover.

Figure 9:
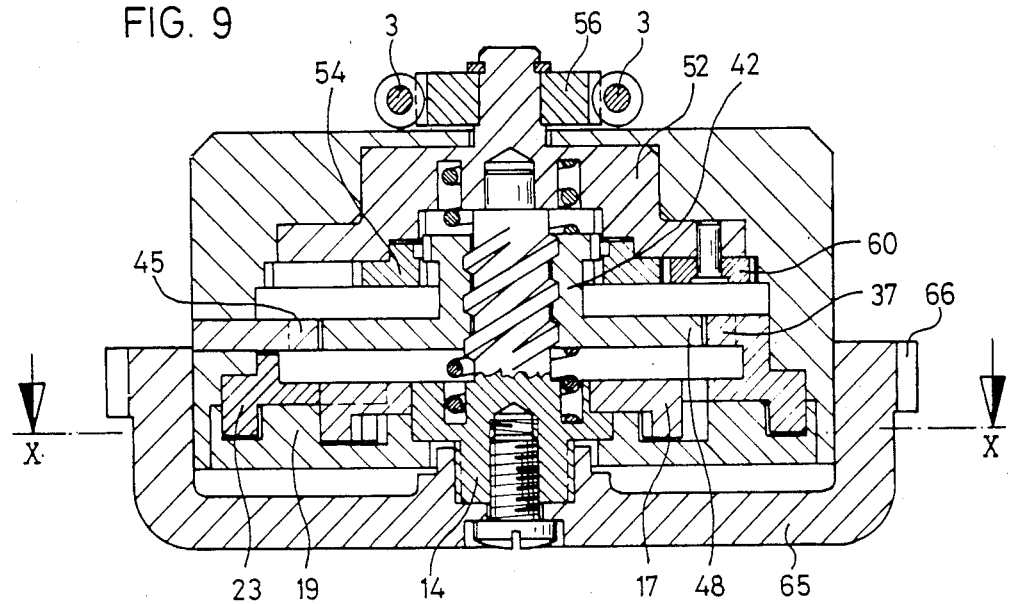
FIG. 9 is a view similar to FIG. 5 for a modified control arrangement with motor drive.
Figure 10:
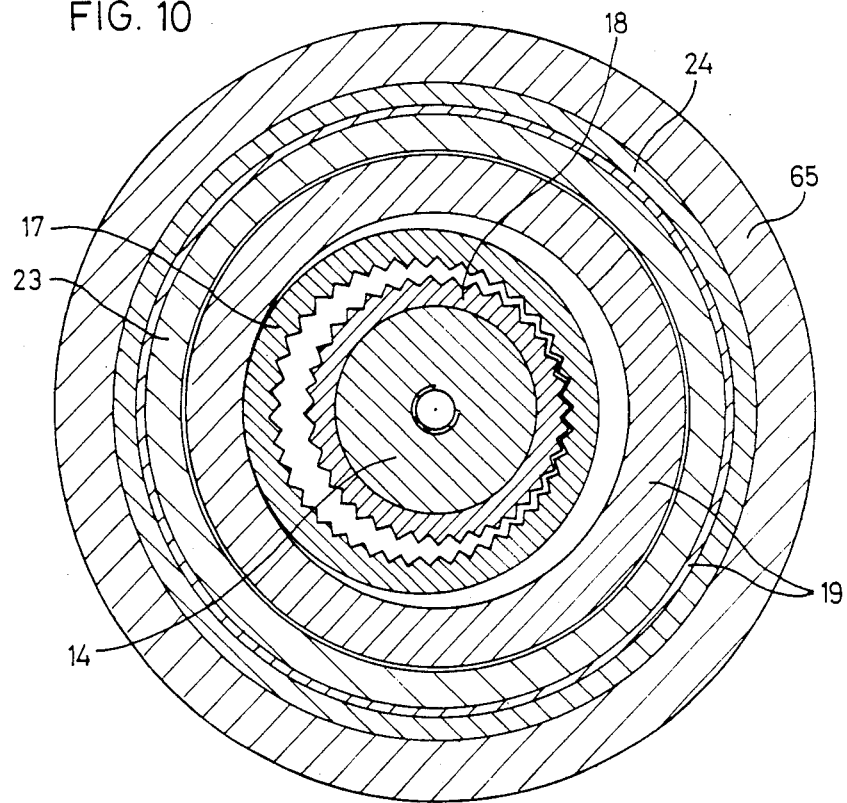
FIG. 10 shows a view similar to FIG. 7, but along the line X—X of FIG. 9.

The embodiment according to the FIGS. 9 and 10, intended for a motor drive, will now be described. In this embodiment, the crank part 11 is replaced by a dome-shaped driving gear 65, which has an external toothing 66 by way of which the drive derived from a motor (not illustrated), preferably an electromotor, takes place. The stop pin 26, the slide 34, the return spring 30 and the recess 32 of the control ring 23 are omitted, since the closing position of the cover on the driving side is predetermined. Otherwise, the construction and manner of operation of this embodiment conform with that of the embodiment according to FIGS. 4 to 8.

Figure 11:
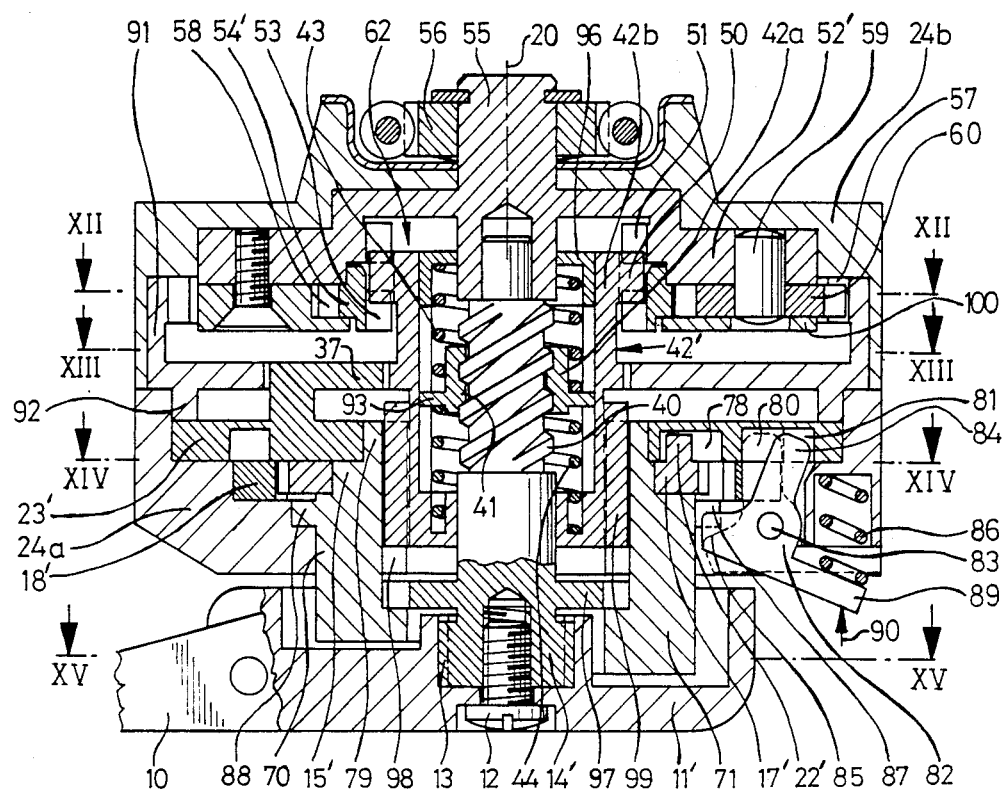
FIG. 11 shows a view corresponding to FIG. 5, but for an additionally modified control arrangement according to the invention.
Figure 12:
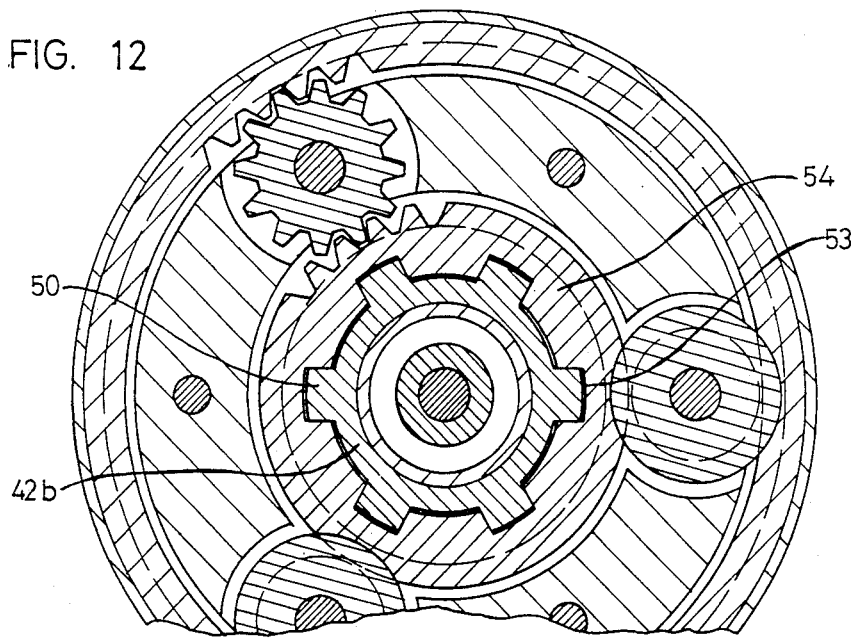
FIG. 12 shows a view taken along the line XII—XII of FIG. 11.
Figure 13:
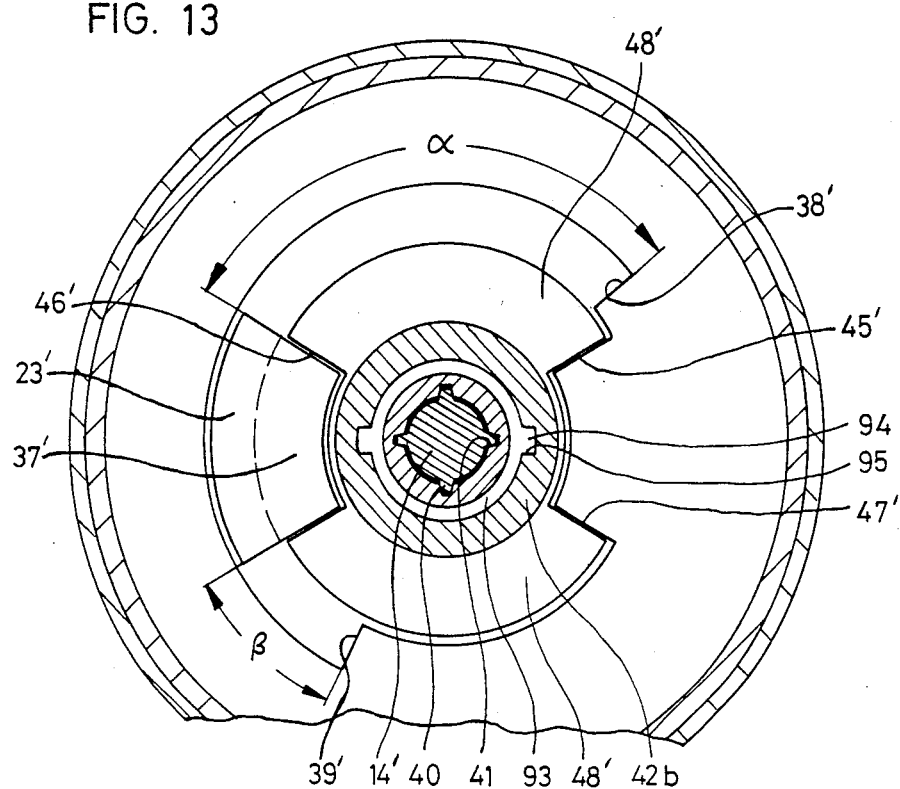
FIG. 13 shows a view taken along the line XIII—XIII of FIG. 11.
Figure 14:
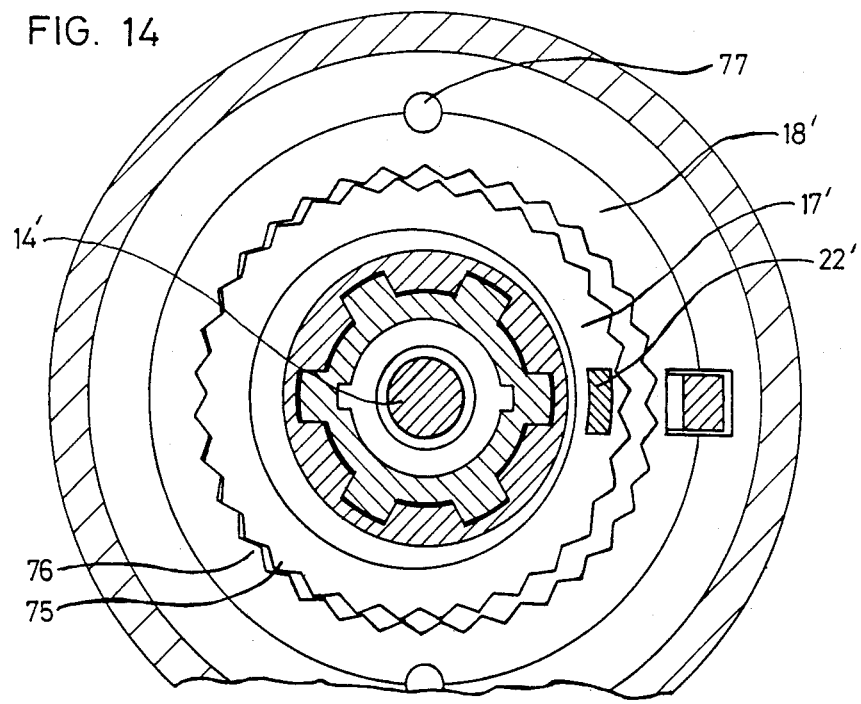
FIG. 14 shows a view taken along the line XIV—XIV of FIG. 11.
Figure 15:
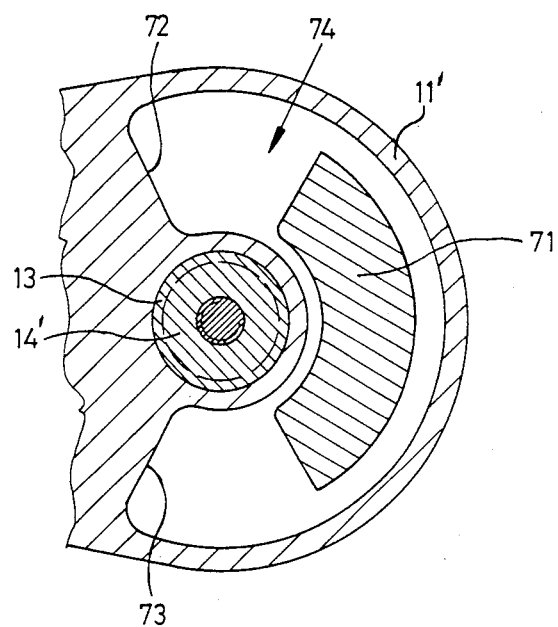
FIG. 15 shows a view taken along the line XV—XV of FIG. 11.

In case of a further modified embodiment according to FIGS. 11 and 15, parts that correspond to those of the preceding embodiments, although structurally somewhat modified, bear the same reference numerals but with a prime designation. The crank part 11' of the crank handle 10 in the form of a snap crank is, again, firmly connected, by way of the screw 12 and the spline toothing 13, with a hub 14'. However, the eccentric 15', in this case, is molded onto a driver part 70 which is rotatably mounted in a lower housing part 24a, instead of being molded onto the hub 14 as in FIGS. 4 and 9. The driver part 70, as its lower end in FIG. 11, carries an axial projection 71, which together with the stop surfaces 72, 73 of the crank part 11' (FIG. 15) forms a lost motion or freewheel, connection generally designated 74.

In the closed position of the cover 1, the corresponding positions of the parts are as illustrated in FIGS. 11 to 15, and the projection 71 is located an equal distance from the stop surfaces 72, 73. The toothed ring 17' is rotatably mounted upon the peripheral surface of the eccentric 15' and has an external toothing 75 (FIG. 14) which engages with an internal toothing 76 of the gear 18'. Gear 18', itself, is firmly connected with the lower part of the housing 24a. This connection may take place, for example, by way of one or several grooved pins 77. As in the case of the embodiments explained previously, the rotational axis 20 of the hub 14' is radially displaced relative to the center axis of the eccentric 15' by an amount which is about equal to the difference of the circle radii of the base of the teeth of the toothings of the parts 17, 18.

The driver 22' projects upward from the toothed ring 17 in an axial direction and it engages into a radial groove 78 at the underside of the control ring 23' that is of sufficient length, radially, in order to permit the eccentric movement of the toothed ring 17 relative to the control ring 23'. The control ring 23' is mounted for rotation about the axis 20 on a projection 79 of the driver part 70. In the underside of the control ring 23', an annular groove 80 is provided which opens into a radial groove 81 that is aligned radially with the radial groove 78. A locking lever 82 is pivotally mounted in lower housing part 24a by an articulated pin 83. The locking lever 82 has a latch 84 and a projection 85. Lever 82 is biased in a clockwise direction by means of a spring 86 that engages an arm 90 of lever 82 (FIG. 11).

In the locking position of the locking lever 82, illustrated in FIG. 11 with solid lines, the latch 84 engages within the radial groove 81 of the control ring 23. Simultaneously, the projection 85 is placed in a radial slit 87 in a collar 88 of the driver part 70. As a result, in a position of the crank handle 10 corresponding to the closed position of the cover 1, the driver part 70 as well as the control ring 23 are prevented from a rotational movement relative to the housing part 24a. Whenever the locking lever 82 is brought counterclockwise into the position shown with broken lines in FIG. 11, then the projection 85 comes out of the radial slit 87 while the latch 84 is received by the annular groove 80 and is prevented by the latter from moving back into the locking position, as soon as the control ring 23 is rotated out of the illustrated position of FIG. 11 in which the latch 84 is radially aligned with the radial groove 81.

The arrangement may be made such that the locking lever 82 only acts as a catch which allows the user to reliably recognize when the closed position of the cover 1 has been reached, the driver part 70 and the control ring 23 being freed for rotational movement as soon as a sufficient force is applied to the crank handle 10. For this purpose, the projection 85 may be beveled, for example, or rounded in order to enable the locking lever 82 to move counter to the biasing force of the spring 86 from the locking position into the freeing position in cooperation with appropriate shaping of the lateral walls of the radial slit 87. Instead of that, the arrangement may also be designed in such a way, however, that for the unlocking, the locking lever 82 will have to be operated, for example, by applying a force to the arm 89 of the locking lever 82 in the direction of the arrow 90.

The stop 37' reaches radially inwardly and stands from the control ring 23', as in the case of the previously described embodiments, and whenever the cover 1 is fully pushed back or fully tilted out, encounters the counterstops 38' or 39' which, in this case, are formed on an insert 91 which is fixed in an upper housing part 24b, that prevents the control ring 23' from making any undesirable axial movements in conjunction with an annular formation 92 that projects axially downwards.

In this embodiment, the control gear 42' consists of an inner control gear part 42a and an outer control gear part 42b. The inner control gear part 42a carries the internal thread 41 engaging with the external thread 40 of the hub 14'. Inner part 42a also has a collar 93 with radial projections 94 (FIG. 13) which are axially shiftably guided in axial grooves 95 of the outside control gear part 42b. The screw springs 43, 44, seated coaxially in relation to the rotational axis 20, are supported at both sides of the collar 93 as well as on a cap 96 of the outside control gear part 42b at the top and, on the bottom, on the control gear part 42b. These springs act to hold the control gear parts 42a and 42b in the middle position corresponding to the closed position of the cover 1 illustrated in FIG. 11. In this middle position, the stop 37' of the control ring 23 and the stop 45' formed on the insert 91 engage with the recesses 46' and 47' at the edge of the control disc 48', which is connected in one piece with the outside control gear part 42b.

The hub 14' carries a collar 97 by way of which the hub is rotatably supported in the driver part 70. An internal spline toothing 98 of the driver part 70 acts together with an external spline toothing of the control gear part 42b in order to transfer torque from the driver part 70 to the control gear and at the same time to permit an axial movement of the control gear part 42b in relation to the driver part 70.

The external toothing 50 is located at the upper end of the outside control gear 42b. Just as in the case of the previously explained embodiment, the external toothing 50 may be selectively brought into engagement with the internal toothing 51 of the planetary carrier 52' or with the internal toothing 53 of the sun wheel 54' which, together with the planetary gears 60, are held in an axial direction by a cover plate 100, which plate 100 is screwed together with the planetary carrier 52'.

Whenever, starting out from the position shown in FIGS. 11 and 15, the locking lever 82 is put into the unlocking position and the hub 14' is rotated by way of the crank 10, then as a result of the mutual engagement of the threads 40, 41, the inside control gear part 42a is shifted axially, while the outside control gear part 42b is blocked by means of the stops 37', 45' from carrying out a rotational movement. Depending upon the rotational direction of the hub 14', either the spring 43 or the spring 44 is compressed. The respective spring shifts the outside control gear part 42b in an axial direction until the external toothing 50 will only still be in engagement with the internal toothing 51 of the planetary carrier 52' or the inside toothing 53 of the sun wheel 54. Then, as soon as the projection 71 of the driver part 70 comes into engagement with the stop surface 72 or 73, the driving pinion 56, connected to the planetary carrier 52', will be driven by the crank 10, either directly or with a reduced transmission ratio. In the case of the axial shifting and the subsequent rotational movement of the outside control gear part 42b, its control disc 48' comes to lie above or below the stops 37', 45', which then prevent any axial movement of the control gear part 42b until the position illustrated in FIG. 13 has again been reached, at which the stops 37', 45' may again engage with the respective recesses 46', 47'.

Otherwise, the manner of operation of this embodiment corresponds to that of the embodiments explained previously.

Modifications of the embodiments given by way of example and explained in detail are possible without any difficulty. In particular, it is possible, especially, for the roof to be developed also in such a way that the cover 1, after it has been tilted so that at least its rear edge is above the fixed surface of the roof, it will be shifted backwards above the fixed part of the roof 4 (so-called spoiler roof). Whereas, with the cover shiftable below the fixed part of the roof, the reference position of the cover is the closed position of the cover, in which position the reduction stage is disengaged or engaged when this position is reached or left, and the terminal positions of the shifting movement of the cover are the fully tilted out position and the fully slid back position of the cover; in the case of a spoiler roof, the fully tilted out position of the cover represents the reference position of the cover. Correspondingly, in the case of the spoiler roof, the closed position of the cover and the fully slid back position of the cover are the terminal positions of the tilting out and the sliding movements, respectively.

While in the case of the embodiments according to FIGS. 4 to 10, the terminal positions of the cover are determined by stops and counterstops between the housing 24 and the control ring 23, it will also be possible to provide corresponding stops and counterstops on the housing lid 19 and the toothed ring 17.

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. Apparatus for controlling tilting movement and sliding movement of the cover of a slidable-tiltable roof of a vehicle having a rotatable hub on an input side, a driving pinion on an output side, an arrangement for establishing a direct drive stage connection between the hub and the driving pinion for producing a sliding movement of the cover, a reduction stage for driving the driving pinion, by way of the hub, for producing the tilting movement with a reduced transmission ratio as compared to that for the sliding movement, and control coupling means for automatically controlling engaging and disengaging of the direct drive and reduction stages, said control means being operable to drivingly engage the reduction stage whenever the hub is driven from a reference position, relative to the cover, in a rotational direction corresponding to that for producing the tilting movement of the cover; wherein the hub and the driving pinion are positioned relative to each other so as to have coinciding rotational axes; and wherein a control gear of the control coupling means is disposed coaxially relative to the coinciding rotational axes of the hub and driving pinion, and is part of the arrangement for establishing said direct drive stage between the hub and the driving pinion, said control gear being axially shiftable for engagement and disengagement of said direct drive and reduction stages, and said reduction stage being arranged coaxially with respect to the rotational axes of the control gear, hub and driving pinion.

2. Apparatus as in claim 1, wherein the control gear has an internal thread in engagement with an external thread of the hub and cooperates with a locking means for preventing rotation of the control gear in an angular position corresponding to the reference position of the cover and for preventing axial movement of the control gear in all other angular positions.

3. Apparatus as in claim 2, wherein the control gear has an external toothing that is selectively engageable with an internal toothing of a coupling part of the control coupling means and an input gear of the reduction stage.

4. Apparatus as in claim 1, wherein the control gear has an external toothing that is selectively engageable with an internal toothing of a coupling part of the control coupling means and an input gear of the reduction stage.

5. Apparatus as in claim 4, comprising means for causing the control gear to assume an axially central position, whenever the control gear is in an angular position corresponding to the reference position of the cover.

6. Apparatus as in claim 5, wherein the control gear, in said central position, engages the coupling part of the control coupling means as well as with said input gear.

7. Apparatus as in claim 5, wherein the means for causing the control gear to assume an axially central position comprises spring means.

8. Apparatus as in claim 3, wherein the control gear comprises two control gear parts which are axially adjustable in a limited way relative to one another and connected in a torque transmitting manner with one another; wherein one of said control gear parts carries the internal thread that engages the external thread of the hub while the other of the control gear parts has the external toothing, which is selectively engageable with the internal toothing of the coupling part of the control coupling means and the input gear of the reduction stage and is connected for rotation with the hub via a free wheel connection.

9. Apparatus as in claim 8, wherein a spring arrangement is provided for axially shifting the other control gear part by spring force when said one control part is axially shifted.

10. Apparatus as in claim 9, wherein said one control gear part is disposed within said other control gear part and wherein said spring arrangement comprises two springs of equal strength, said springs being, on the one hand, supported on axially opposite sides of said one control part and, on the other hand, by facing portions of said other control gear part.

11. Apparatus as in claim 3, wherein the reduction stage comprises a planetary gear arrangement.

12. Apparatus as in claim 11, wherein the coupling part of the control coupling means is, at the same time, a planetary carrier of the planetary gear arrangement.

13. Apparatus as in claim 12, wherein said input gear of the reduction stage comprises a sun wheel of the planetary gear arrangement.

14. Apparatus as in claim 1, comprising an arrangement for limiting the rotational movement of the hub at end positions of the cover sliding and shifting movements relative to the reference position of the cover.

15. Apparatus as in claim 14, comprising a locking arrangement for releasably locking the hub in the position corresponding to the reference position of the cover.

16. Apparatus as in claim 15, wherein part of at least one of the limiting arrangement and the locking arrangement is a rotatable control part that is disposed substantially concentrically with respect to the coincident axes of the hub and driving pinion, said control part being driven by an additional reduction stage in such a way that the total rotational displacement of said control part due to rotation of said hub for displacing the cover between terminal positions of its movements is less than 360 degrees.

17. Apparatus as in claim 16, wherein the additional reduction stage comprises a stationary gear with a toothing that is concentrically disposed in relation to the coincident axes of the hub and the driving pinion and which is in meshing engagment with a toothing of a toothed ring which is rotatable on an eccentric, that is connected for rotation with the hub, around an axis which, as compared to the coincident axes of hub and driving pinion, is radially displaced by an amount which is approximately equal to the difference between circle radii of a base of a tooth of the toothing of the stationary gear and of the toothed ring.

18. Apparatus as in claim 15, wherein the locking arrangement has a resiliently biased locking member which is operable, in the reference position of the cover, to hinder the control part driven by way of the additional reduction step and the control gear from being rotated.

19. Apparatus as in claim 18, wherein the locking member comprises a lever which, as a result of application of an increased rotational force, may be transferred automatically into an unlocking position.

20. Apparatus as in claim 18, wherein the locking member is constructed such that, for the release of the locking arrangement in the reference position of the cover, an additional unlocking force must be applied directly to the locking member.

21. Apparatus for the control of the tilting movement and the sliding movement of a cover of a slidable-tiltable roof in a vehicle comprising a rotatable hub on an input side; a driving pinion on an output side; an arrangement for establishing a direct drive stage connection between the hub and driving pinion for producing the sliding movement; a reduction stage in the form of a planetary gear arrangement for driving the driving pinion, by way of the hub, for producing the tilting movement with a transmission ratio that is reduced in relation to that for producing the sliding movement; and a control coupling means for automatically controlling alternate engagement and disengagement of the direct drive and reduction stages, said control coupling means being operable to drivingly engage the reduction stage whenever the hub is driven from a reference position, relative to the cover, in a rotational direction corresponding to that for producing the cover tilting movement, wherein the hub, the driving pinion, the control coupling means and the reduction stage are all disposed in coaxiall relationship with respect to each other.

* * * * *